L. R. HITCHCOCK
POST-HOLE AUGER.
No. 181,264.  Patented Aug. 22 1876.
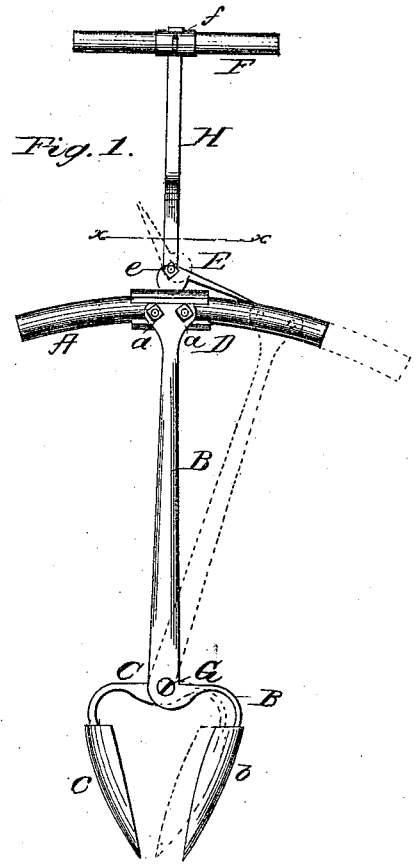
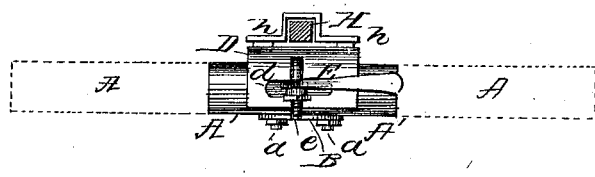
Witnesses  Inventor
Fred G. Dietrich  Luke R. Hitchcock
John B. Bushnell  per Dewitt C. Allen
  Atty

UNITED STATES PATENT OFFICE.

LUKE R. HITCHCOCK, OF FILLMORE, NEW YORK.

IMPROVEMENT IN POST-HOLE AUGERS.

Specification forming part of Letters Patent No. 181,264, dated August 22, 1876; application filed July 24, 1876.

*To all whom it may concern:*

Be it known that I, LUKE R. HITCHCOCK, of Fillmore, county of Allegany, State of New York, have invented certain new and useful Improvements in Post-Hole Augers, of which the following is a full, clear, and exact description, reference being made to the accompanying drawing, forming a part of this specification, in which—

Figure 1 is a side view; Fig. 2, a top or plan view of the locking device.

Like letters of reference refer to like parts.

This invention relates to that class of post-hole augers in which the points of the blades can be adjusted toward or from each other as desired; and the invention consists in the combination and arrangement of parts, as will be hereinafter more fully described.

b c are the two blades of the post-hole auger, secured respectively to the arms B C. The blades b c are so arranged that the edges thereof project to the right and left, so that one of the edges of each blade will cut the earth as the auger is turned around, and the arms B C are bent so that the points of the blades will incline toward each other. The arms B C are also bent nearly at right angles just above the blades, and pivoted to each other at G, as clearly shown in Fig. 1, so that the points of the blades can be moved toward or from each other, as desired. The arm B of the blade b is rigidly secured to a curved bar or handle, A, at or near its center, by means of bolts and nuts a a. The arm C of the blade c is provided on its upper end with a ferrule, D, which nearly encircles the bar or handle A, whereby the bar or handle A and arm B can be moved in either direction from the arm C, and rigidly secured in place by a pivoted cam-lever, E. The cam-lever E is secured to an arm on the top of the ferrule, and the ferrule is provided with a slot, d, through which the cam works against the bar or handle A. H is a bar rigidly secured to the arm C by a hasp, h, and pivoted at its lower end with said arm C to the arm B at G. This bar H extends above the curved bar or handle A, and is so bent that the T-shaped handle secured on the upper end thereof will come directly over the bar or handle A. The handle F is adjustably secured to the bar H by means of a thumb-screw, f.

Fig. 3 shows a short handle, which is to be substituted for the curved bar or handle A when it is desired to bore a deep hole.

From the foregoing description it will be perceived that the point of the blade b can be moved toward or from the point of the blade c by merely moving the curved bar or handle A and arm B toward or from the arm C, as clearly shown in dotted lines in Fig. 2. By this means the auger can be used upon any kind of soil. For instance, in dry sand the blades can be compressed together after they have been inserted in the ground, so that the sand will not drop out when the auger is removed; and in damp earth or clay the points of the blades can be readily thrown apart, so that the earth or clay will fall out after the auger is removed from the ground.

It will also be observed that in adjusting the blades toward or from each other the auger will make a smaller or larger hole, as desired, which in a full-sized auger will make a hole from six to ten inches in diameter.

I claim as my invention—

1. The combination, with the arm and blade C c and ferrule D, of the arm and blade B b and curved bar or handle A, substantially as and for the purpose specified.

2. The combination, with the arm and blade B b, having curved bar or handle A, and arm and blade C c, having ferrule D, of the pivoted cam E, substantially as and for the purpose specified.

3. The combination, with the arms and blades B C b c, of the bar H and handle F, the several parts constructed and arranged to operate in the manner substantially as and for the purpose specified.

LUKE R. HITCHCOCK.

Witnesses:
J. E. FRANKLIN,
H. M. HOWDEN.